United States Patent [19]

Hanagata et al.

[11] 4,350,987

[45] Sep. 21, 1982

[54] PRINTING DEVICE

[75] Inventors: Takayoshi Hanagata; Atsushi Noda, both of Yokohama, Japan

[73] Assignee: Canon Kabushiki Kaisha, Tokyo, Japan

[21] Appl. No.: 180,102

[22] Filed: Aug. 21, 1980

[30] Foreign Application Priority Data

Aug. 31, 1979 [JP] Japan ................................ 54-111273

[51] Int. Cl.³ ............................................ G01D 15/10

[52] U.S. Cl. ................................ 346/76 PH; 400/120

[58] Field of Search .......................... 346/76 PH, 136; 400/120

[56] References Cited

U.S. PATENT DOCUMENTS 4,000,393 12/1976 Cochran et al. ............... 346/76 PH

*Primary Examiner*—John Gonzales

*Attorney, Agent, or Firm*—Fitzpatrick, Cella, Harper & Scinto

[57] ABSTRACT

A printing device to perform character printing by urging a print head onto recording paper, the device being provided with a print head urging mechanism and paper forwarding mechanism. The paper forwarding mechanism has both the functions of automatic paper forwarding and manual paper forwarding, and, when paper is forwarded by manual operation, a force exerted from the manual operation acts on the abovementioned print head urging mechanism to cause the print head to separate from the recording paper.

3 Claims, 2 Drawing Figures

PRINTING DEVICE

BACKGROUND OF THE INVENTION

1. Field of the Invention

This invention relates to a printing device such as a thermal printer or an electric discharging type printer, in which the printing is effected by urging a print head onto recording paper.

2. Description of Prior Art

Conventional printing devices such as a thermal printer, an electric discharging type printer, etc., wherein the printing is done by urging the print head onto recording paper, are of such a construction that, when the paper forwarding is done by manual operation, the print head is parted from the recording paper by a separate power source.

That is, as illustrated in FIG. 1 of the accompanying drawing, the print head 1 is slidably mounted on a guide rail 2, and a platen (or a pad) 3 is provided in parallel with the guide rail 2. Below the pad 3, there is extended a paper forwarding roller 4, by way of which recording paper 5 is led out onto the pad 3.

A lever 6 is fixedly provided at one end of the guide rail 2, and is constantly subjected to a clockwise rotational force by a coil spring 7, whereby the print head 1 is constantly urged to the pad 3 through the guide rail 2.

In case the printing device is a thermal printer, the print head 1 moves on the guide rail 2 in a state where its heat generating part is in contact with the recording paper 5, while performing the sequential printing by means of digit changing means such as a pulse motor, etc. (not shown).

When the printing for one line is terminated, the print head 1 is separated from the recording paper, and then returns to its original position. In order to thus keep the print head 1 away from the recording paper 5 at the time of its return to the original position or during a paper forwarding operation, a solenoid 8 to raise the print head 1 is provided on the lever 6. By this solenoid 8, the guide rail 2 is rotated counterclockwise to temporarily separate the print head 1 from the recording paper 5 so that the paper forwarding may be done during this temporary separation. Besides being operated at the time of the automatic paper forwarding, wherein the paper is forwarded by the pulse motor (not shown) through a power transmission gear 9 by the paper forwarding roller 4, this print head raising solenoid 8 is also operated at the time of manual paper forwarding. That is to say, a manually rotatable gear 10 to be meshed with the paper forwarding gear 9 is pivotally supported on a lever 11, which is constantly energized in a direction of separating the manually rotatable gear 10 from the power transmission gear 9 by a coil spring 12.

The manually rotatable gear 10, when it is rotated by an operator for the paper forwarding, is pushed downward and meshed with the power transmission gear 9 to rotate the paper forwarding roller 4. At this time, if the print head 1 is not away from the recording paper 5, jamming of the paper may occur. Therefore, a microswitch 13 to be actuated by the lever 11 which has been pushed down is provided beneath the lever so that the print head raising solenoid 8 may be actuated thereby. As a result of this, it becomes possible to regularly forward the paper even by the manual operation.

However, with the abovementioned construction, wherein the print head is separated from the recording paper by a power source such as the print head raising solenoid 8, when the paper is forwarded by the manual operation, there possibly arises serious disadvantages to be mentioned hereinbelow.

(1) Since the print head should be kept away from the recording paper, if no electric conduction to the solenoid is possible, i.e., if the power source switch is not turned on, the manual paper forwarding operation cannot be effected.

(2) The part such as the microswitch 13, etc. to turn on the solenoid 8 often tends to readily get into troubles such as insufficient contact, etc., thereby lowering the reliability of the device.

SUMMARY OF THE INVENTION

It is an object of the present invention to provide a printing device of low manufacturing cost and high reliability.

It is another object of the present invention to provide a printing device which enables the manual paper forwarding operation to be effected without the use of a separate driving source.

It is still another object of the present invention to provide a printing device which enables the manual paper forwarding operation to be done with high reliability.

DESCRIPTION OF THE PREFERRED EMBODIMENT

Figure 1:
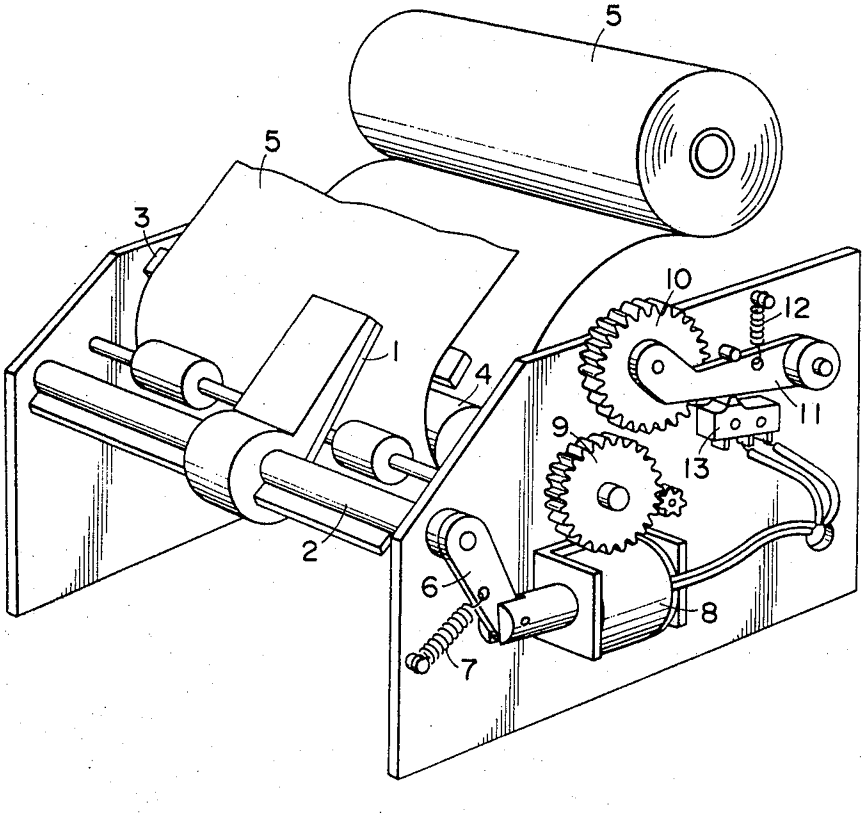
FIG. 1 (PRIOR ART)
FIG. 1 is a perspective view of a conventional printing device.
Figure 2:
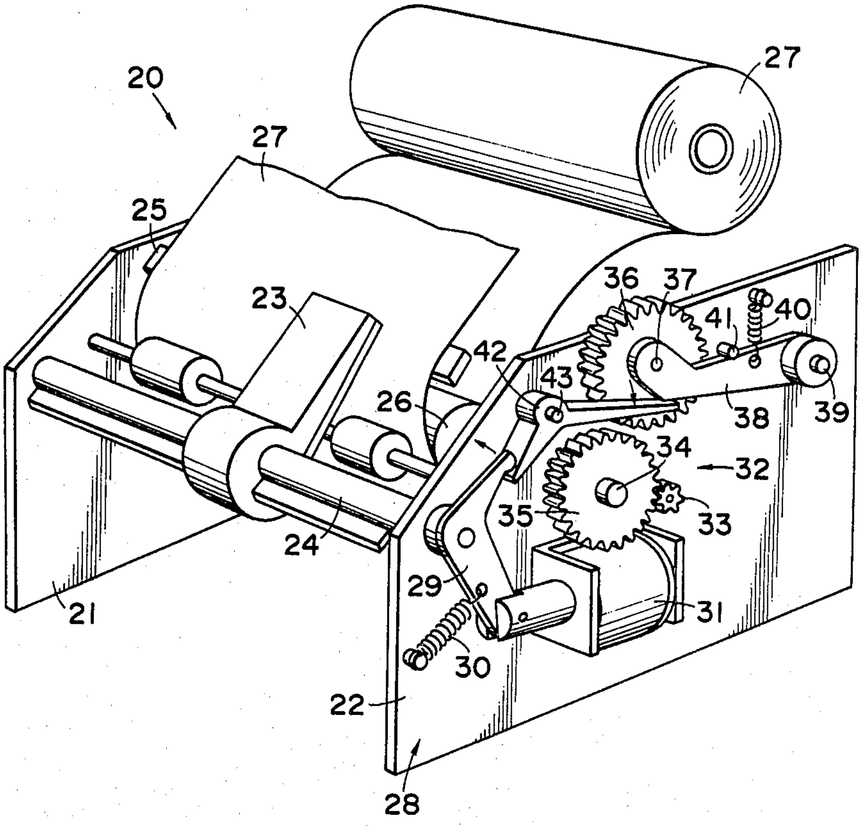
FIG. 2 is also a perspective view showing a main part of one embodiment of the printing device according to the present invention.

Referring to FIG. 2, the printing device 20 according to the preferred embodiment of the present invention has a pair of mutually opposed frame plates 21, 22. A guide rail 24 to cause a print head 23 to slide therealong without free rotation is extended between these opposed frame plates 21, 22. In parallel with the guide rail 24, a platen (or a pad) 25 made of a rubber material is provided. Below the pad 25, there is provided parallel thereto a paper forwarding roller 26, by way of which a recording paper 27 is led to the pad 25. The print head 23 is a thermal head or an electric discharging type head, and performs the character printing by a driving device (not shown), while it is in contact with the recording paper.

Outside the frame plate 22, there is mounted a print head urging mechanism 28 of a construction, in which the print head 23 is constantly urged to the recording paper during the printing operation and is separated from the recording paper during the paper forwarding operation.

The print head urging mechanism 28 is constructed with a lever 29 fixedly provided at one end of a shaft of the guide rail 24 for raising the print head upward, a coil spring 30 attached to the frame plate 22 to rotate the lever 29 in the clockwise direction for urging the print head 23 constantly toward the recording paper 27, and a solenoid 31 which causes the print head raising lever 29 to rotate counter-clockwise against the force of the coil spring 30 to temporarily separate the print head from the recording paper.

Also, outside the frame plate 22, there is mounted a paper forwarding mechanism 32 to rotate the paper forwarding roller 26. The paper forwarding mechanism 32 has a transmission gear 35 fixedly provided on a shaft 34 of the paper forwarding roller 26. The mechanism is further provided with a manually rotatable gear 36 which is meshed with the transmission gear 35 at the time of the paper forwarding operation and can be rotated by an operator, and a lever 38 which rotatably supports the shaft 37. The lever 38 is held on the frame plate 22 by a pin 39 in an oscillatable manner, and is constantly pulled upward to a position of a stopper 41 by a coil spring 40. Accordingly, the manually rotatable gear 36 is usually separated from the transmission gear 35. When this gear 36 is rotated for paper forwarding, it is lowered downward against the force of the coil spring 40 of the lever 38 by an urging force to be meshed with the transmission gear 35, thereby rotating the paper forwarding roller 26 through the gear 36 to perform the paper forwarding.

In order to separate the print head 23 from the recording paper when manually performing the paper forwarding operation, a head escaping lever 42 is provided in the paper forwarding mechanism. This lever, rotatably held by a pin 43 on the frame plate, is caused to rotate at its one end in the clockwise direction by the lever 38 as shown by an arrow mark when the manually rotatable gear 36 is lowered, and causes the print head raising lever 29 to rotate counter-clockwise at its other end, as shown by an arrow mark, whereby the guide rail 24 is rotated to separate the print head 23 from the recording paper.

As is apparent from the above-described embodiment, when the manually rotatable gear 36 of the paper forwarding mechanism is to be rotated, the print head 23 is automatically separated from the recording paper, so that the paper forwarding operation can be done manually without the power source for the solenoid 31 being turned on. Accordingly, there is no necessity for providing a mechanically vulnerable part such as microswitch to be associated with the supporting member of the gear 36, hence a device of a rigid construction can be obtained.

What we claim is:

1. A printing device comprising:

a print head for performing printing on a recording paper;

urging means for causing said print head to rotate towards and be urged into contact with said recording paper;

paper forwarding means having a manual paper forwarding function and, at the time of the manual paper forwarding operation and under the action of a force derived from the manual paper forwarding function, for causing said print head to rotate away from said recording paper against the force exerted by said urging means toward the recording paper, wherein said paper forwarding means comprises:

a paper forwarding rotary member with a paper forwarding power transmission wheel fixedly provided at one end of a rotational shaft thereof;

a manual paper forwarding rotary member urged away from said power transmission wheel by a spring and movable to engage with said power transmission wheel against the force of said spring to thereby impart a paper forwarding force; and a transmission member engagable with said urging means when said manual member moves into engagement with said power transmission wheel to thereby cause said print head to rotate away from said recording paper.

2. A printing device according to claim 1, wherein said printing device includes a solenoid member for causing said print head to separate from the recording paper.

3. A printing device according to claim 1 or 2, wherein said printing device includes a motor to impart a paper forwarding force to said paper forwarding rotary member.

* * * * *